(12) United States Patent
Tomioka

(10) Patent No.: US 7,907,351 B2
(45) Date of Patent: Mar. 15, 2011

(54) VARIABLE POWER OPTICAL SYSTEM AND IMAGING DEVICE

(75) Inventor: Ukyo Tomioka, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 4 days.

(21) Appl. No.: 12/395,292

(22) Filed: Feb. 27, 2009

(65) Prior Publication Data

US 2009/0219626 A1 Sep. 3, 2009

(30) Foreign Application Priority Data

Feb. 29, 2008 (JP) ................ P2008-049312

(51) Int. Cl.
*G02B 15/14* (2006.01)
(52) U.S. Cl. .................. 359/691; 359/680; 359/685
(58) Field of Classification Search .................. 359/686, 359/689, 691, 682, 676, 683, 680, 685
See application file for complete search history.

(56) References Cited

U.S. PATENT DOCUMENTS

| | | | | |
|---|---|---|---|---|
| 6,671,103 B2 * | 12/2003 | Itoh | ............... | 359/689 |
| 6,917,477 B2 * | 7/2005 | Takatsuki | ............. | 359/691 |
| 7,167,318 B2 * | 1/2007 | Tomioka | ............. | 359/682 |
| 7,453,651 B2 * | 11/2008 | Narikawa et al. | ............ | 359/689 |
| 2006/0077565 A1 | 4/2006 | Tomioka | | |

FOREIGN PATENT DOCUMENTS

| | | |
|---|---|---|
| JP | 8-5914 A | 1/1996 |
| JP | 2004-198855 A | 7/2004 |
| JP | 2005-134887 A | 5/2005 |
| JP | 2006-91643 A | 4/2006 |
| JP | 2007-232996 A | 9/2007 |

OTHER PUBLICATIONS

Extended European Search Report mailed Jun. 3, 2009 for corresponding European application No. 09002749-1.

* cited by examiner

*Primary Examiner* — Darryl J Collins
*Assistant Examiner* — Zachary Wilkes
(74) *Attorney, Agent, or Firm* — Birch, Stewart, Kolasch & Birch, LLP

(57) ABSTRACT

A variable power optical system is provided and includes: in order from the object side, a first lens group having a negative refractive power and including a negative lens group and a positive lens group; a stop; and a second lens group having a positive refractive power and includes a sub-lens group having a positive refractive power as a whole and arranged on the most object side, the sub-lens group including a first lens having a positive refractive power having at least one aspherical surface, a second lens having a negative refractive power, and a third lens having a positive refractive power. The second lens group is moved to the object side along an optical axis to perform a variable power operation from the wide angle end to the telephoto end with moving the first lens group to make a correction of an image plane position.

17 Claims, 9 Drawing Sheets

VARIABLE POWER OPTICAL SYSTEM AND IMAGING DEVICE

This application is based on and claims priority under 35 U.S.C §119 from Japanese Patent Application No. 2008-049312, filed on Feb. 29, 2008, the entire disclosure of which is herein incorporated by reference.

BACKGROUND OF THE INVENTION

1. Field of the Invention

The present invention relates to a variable power optical system and an imaging device used for a video camera, an electronic still camera and so forth. More particularly, the present invention relates to a variable power optical system and an imaging device equipped with the variable power optical system which is capable of being preferably used as a surveillance camera and also capable of being used in both the visible region and the near infrared region.

2. Description of Related Art

It is general to use surveillance cameras when empty facilities are operated. In many cases, these surveillance cameras take an image by visible rays in the daytime and by near infrared rays at night. Therefore, it is required that these surveillance cameras are capable of being used in both the visible region and the near infrared region. For the above reasons, concerning the lens system, it is necessary that the chromatic aberration is excellently corrected in a region from the visible region to the near infrared region. Concerning the optical system applied to the surveillance cameras, it is necessary to provide a variable power optical system. Further, the optical system is required to be compact and the optical performance is required to be high.

Concerning the variable power optical system, the size of which is reduced, capable of being used in a region from the visible region to the near infrared region, on which a surveillance camera can be mounted, systems disclosed in JP-A-2005-134887 and JP-A-2006-91643 are known. Each optical system described in JP-A-2005-134887 and JP-A-2006-91643 includes: a first lens group having a negative refractive power; a stop; and a second lens group having a positive refractive power, which are arranged in order from the object side. The first lens group includes two meniscus lenses having a negative refractive power and a cemented lens in which a biconcave lens and a positive lens are cemented to each other, which are arranged in order from the object side, and the second lens group includes two single positive lenses which are arranged from the most object side.

In this connection, recently, there is a rising demand for an image of high quality even in the use of surveillance cameras. Especially, a demand for a variable power optical system is increasing which is applicable to cameras having imaging elements, the number of pixels of which is not less than one million, and capable of being used in a region from the visible region to the near infrared region. However, in order to meet the above demands by the conventional optical system, it is necessary to reduce an aperture ratio. In this case, it is difficult to use the optical system under an imaging condition of the use of surveillance cameras in which illuminance is low. It is necessary for the surveillance camera to be capable of specifying an object even in an environment of low illuminance. Therefore, the lens system of the surveillance camera is required to be a fast optical system, the aperture ratio of which is high.

SUMMARY OF THE INVENTION

An object of an illustrative, non-limiting embodiment of the present invention is to provide a variable power optical system, the optical performance of which is high so that an image of high quality can be attained in a wide wave-length region from the visible region to the near infrared region although the size is small and the aperture ratio is high. Another object of the present invention is to provide an imaging device having the variable power optical system.

According to an aspect of the invention, there is provided a variable power optical system including: in order from an object side thereof, a first lens group having a negative refractive power; a stop; and a second lens group having a positive refractive power. The second lens group is moved to the object side along an optical axis thereof to perform a variable power operation from a wide angle end to a telephoto end of the variable power optical system, and the first lens group is moved to make a correction of an image plane position in accordance with the variable power operation. The first lens group includes a negative lens group and a positive lens group in order from the object side, and the second lens group includes a sub-lens group having a positive refractive power as a whole and arranged on the most object side. The sub-lens group includes a first lens having a positive refractive power having at least one aspherical, a second lens having a negative refractive power, and a third lens having a positive refractive power in order from the object side.

In this connection, "the lens group" described above includes not only a lens group having a plurality of lenses but also a single lens.

In the variable power optical system, when the sub-lens group arranged on the most object side of the second lens group has a lens arrangement including a positive lens, a negative lens and a positive lens, the chromatic aberration can be easily corrected in a wide wave-length region from the visible region to the near infrared region. Further, when an aspherical lens is used as the lens on the most object side of the second lens group, the spherical aberration, which tends to increase in accordance with an increase in the aperture ratio, can be easily corrected. Accordingly, it becomes easy to realize a high aperture ratio. Further, by this aspherical lens, the aberration except for the spherical aberration can be easily corrected. Accordingly, it becomes easy to acquire a high optical performance while the size is being reduced.

In the variable power optical system, the following conditional expression (1) may be satisfied:

$$0.7 < f2s/f2 < 2.0 \tag{1}$$

where f2 is a focal length of the second lens group and f2s is a focal length of the sub-lens group.

In the variable power optical system, the following conditional expression (2) may be satisfied:

$$vd2m > 50.0 \tag{2}$$

where vd2m is an average value of Abbe numbers of the first and the third lens at the d-line.

In the variable power optical system, the second lens group may include a positive lens arranged on the most image side and satisfying the following conditional expression (3):

$$vd25 > 65.0 \tag{3}$$

where vd25 is the Abbe number of the positive lens at the d-line.

In the variable power optical system, the first lens may be a biconvex lens, the second lens may be a biconcave lens and the third lens may be a biconvex lens. Further, the second lens group may include five lenses including the sub-lens group, a negative meniscus lens having a concave surface on the image side, and a positive lens in order from the object side.

In this regard, "the first lens being a biconvex" means a shape of the first lens in the paraxial region.

In the variable power optical system, the first lens group may includes three lenses including a negative meniscus lens, a biconcave lens having a negative refractive power, and a positive lens in order from the object side. Alternatively, the first lens group may include four lenses including a negative meniscus lens, another negative meniscus lens, a biconcave lens having a negative refractive power, and a positive lens in order from the object side.

In the variable power optical system, the first lens group may include at least one positive lens, and the following conditional expression (4) is satisfied:

$$vd1p<21.0 \qquad (4)$$

where vd1p is the Abbe number of the at least one positive lens at the d-line

In this regard, it is preferable that the positive lens arranged on the most image side in the positive lenses included in the first lens group satisfies the conditional expression (4). Thus, the longitudinal chromatic aberration can be advantageously corrected.

The variable power optical system may further includes a third lens group having a negative refractive power arranged on the image side of the second lens group, the third lens group being fixed at the time of the variable power operation.

According to an aspect of the invention, there is provided an imaging device including: a variable power optical system described above; and an imaging element for taking an object image formed by the variable power optical system. Examples of the imaging device are: a television camera, a video camera and a surveillance camera.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

Figure 1:
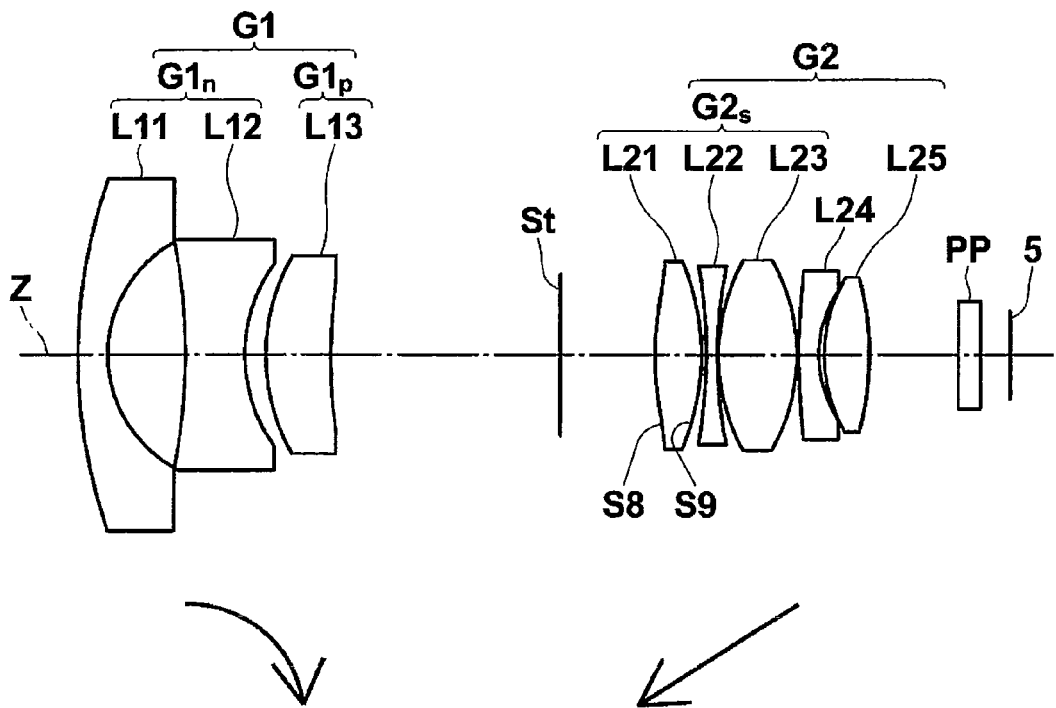
FIG. 1 is a sectional view showing a lens arrangement of a variable power optical system of Example 1 of the present invention.

A variable power optical system according to an exemplary embodiment of the present invention includes: a first lens group having a negative lens group and a positive lens group, having a negative refractive power as a whole; and a second lens group having a positive refractive power, wherein a sub-lens group arranged on the most object side of the second lens group includes a positive lens, a negative lens and a positive lens in order in which an aspherical lens is effectively arranged. Due to the above arrangement, although the optical system is compact and the aperture ratio is high, it is possible to realize an optical performance capable of acquiring an image of high quality in a wide wave-length region from the visible region to the near infrared region.

An imaging device of the present invention includes a variable power optical system of the present invention. Therefore, the imaging device can be made compact and excellently used even in a photographing condition of low illuminance and it is possible to acquire an image of high quality in a wide wave-length region from the visible region to the near infrared region.

Referring to the drawings, exemplary embodiments of the present invention will be explained in detail below.

FIG. 1 is a sectional view showing an arrangement of a variable power optical system according to an exemplary embodiment of the present invention. FIG. 1 corresponds to a variable power optical system of Example 1 described later. FIGS. 2 to 5 are sectional views showing arrangements of variable power optical systems according to other exemplary embodiments of the present invention. FIGS. 2 to 5 respectively correspond to the variable power optical systems of Examples 2 to 5 described later.

Examples 1 to 5 shown in FIGS. 1 to 5 are basically configured in the same manner. FIGS. 1 to 5 are illustrated basically in the same manner. Therefore, referring to FIG. 1, a variable power optical system of an exemplary embodiment of the present invention will be explained here.

This variable power optical system includes: a first lens group G1 having a negative refractive power; an aperture stop St; and a second lens group G2 having a positive refractive power, in order from the object side along the optical axis Z. The above constitution in which the negative refractive power precedes is suitable for realizing a wide angle and further a back focal length can be relatively easily ensured.

In this connection, the aperture stop St shown in FIG. 1 does not necessarily express a size and a shape of the aperture stop St but expresses a position on the optical axis Z. In FIG. 1, the left side is the object side and the right side is the image side. FIG. 1 shows a lens arrangement at the wide angle end at the time of focusing an infinite point. A locus of the movement of each lens group at the time of varying the magnifying power from the wide angle end to the telephoto end is schematically shown in a lower portion of FIG. 1.

This variable power optical system can be used in both the visible region and the near infrared region. For example, the variable power optical system can be suitably applied to a surveillance camera used around the clock. In FIG. 1, consideration is given to a case in which the variable power optical system is applied to an imaging device. Therefore, the imaging element 5 arranged on the image formation plane of the variable power optical system is also shown in FIG. 1. The imaging element 5 captures an image of an object which is formed by the variable power optical system. An imaging plane of the imaging element 5 is located on an image formation plane of the variable power optical system.

When the variable power optical system is applied to the imaging device, it is preferable that one of the various type filters such as a cover glass, an infrared ray cutting filter and a low pass filter is arranged between the optical system and the image formation plane (the imaging plane) according to the constitution on the camera side onto which the lens is attached. In the example, shown in FIG. 1, the optical member PP, which is formed into a parallel-plate-shape, is arranged between the second lens group G2 and the imaging element 5.

This variable power optical system is configured as follows. When the second lens group G2 is moved to an object side along the optical axis Z, the magnifying power is varied from the wide angle side to the telescopic side. A correction of the image plane position, which is accompanied by the variable power operation from the wide angle end to the telephoto end, is made by moving the first lens group G1 onto the image surface side along the optical axis Z. When the magnifying power is varied from the wide angle end to the telephoto end, the first lens group G1 and the second lens group G2 are moved so that they can draw the loci shown by solid line arrows in FIG. 1. In this variable power optical system, when the first lens group G1 is moved along the optical axis Z, focusing is performed. The first lens group G1 also has a function of a focusing group.

The first lens group G1 includes a negative lens group G1n having a negative refractive power and a positive lens group G1p having a positive refractive power in order from the object side. In the example shown in FIG. 1, the first lens group G1 includes three lenses. The negative lens group G1n includes: a lens L11 which is a negative meniscus lens having a convex surface on the object side; and a lens L12 which is a biconcave lens having a negative refractive power. The positive lens group G1p includes a lens L13 which is a positive meniscus lens having a convex surface on the object side.

As shown in the example illustrated in FIG. 1, when the negative meniscus lens having the convex surface on the object side is arranged on the most object side in the lens system, the spherical aberration at the telephoto end can be easily corrected and further the angle of view can be advantageously made wide.

In the second lens group G2, the sub-lens group G2s having a positive refractive power as a whole is arranged on the most object side. The sub-lens group G2s includes: a first lens having a positive refractive power having at least one aspherical surface; a second lens having a positive refractive power; and a third lens having a positive refractive power.

In the example shown in FIG. 1, the first lens, the second lens and the third lens of the sub-lens group G2s respectively correspond to the biconvex lens L21, the biconcave lens L22 and the biconvex lens L23. In the example shown in FIG. 1, the second lens group G2 includes five lenses including: a lens L24 which is a negative meniscus lens having a concave surface on the image side; and a lens L25 having a positive refractive power, in order from the image side of the lens group G2s.

In the sub-lens group G2s arranged at a position close to the aperture stop St, the negative lens is arranged between two positive lenses and chromatic aberration having a reverse direction to those generated in two positive lenses, is generated. Due to the foregoing, an amount of the chromatic aberration (the longitudinal chromatic aberration) generated as a whole can be suppressed. Accordingly, it becomes possible to realize an excellent correction of correcting the chromatic aberration in a wide wavelength region from the visible region to the near infrared region.

In the second lens group G2, when the lens L21 on the most object side is made to be an aspherical lens, the spherical aberration, which is generated being accompanied by the high aperture ratio, can be easily corrected and it becomes easy to ensure a high aperture ratio. To be in more detail, it is preferable that the lens L21 is a biconvex lens for converging a light flux dispersed by the first lens group G1 having a negative refractive power. On the assumption that the lens L21 is a spherical lens, in a direction from the optical axis toward the periphery of the lens, the positive refractive power is increased and the spherical aberration may be excessively corrected in the peripheral portion.

On the other hand, when the lens L21 is made to be an aspherical lens like the present embodiment and a shape of the lens L21 is formed in such a manner that the positive refractive power is reduced in a direction from a portion near the optical axis to the periphery of the lens as shown in the example illustrated in FIG. 1, the spherical aberration can be prevented from being excessively corrected and an amount of generation of the spherical aberration can be reduced. Accordingly, a high aperture ratio can be easily realized.

When the lens L21 is made to be an aspherical lens, various types of aberration including the chromatic aberration can be easily corrected. Therefore, while the size is being reduced, a high optical performance can be easily ensured. Especially, as shown by the example illustrated in FIG. 1, when the biconvex lens, both the surface S8 on the object side and the surface S9 on the image side of which are aspherical, is used, it is possible to obtain a higher aberration correcting effect. When the sub-lens group G2s includes a biconvex lens and a biconcave lens, it is possible to give strong positive and negative power to the respective lenses. Therefore, while the size is being reduced by the small number of lenses, the aberration can be efficiently corrected.

As described above, in a variable power optical system of the present embodiment, by the power arrangement of the sub-lens group G2s of the second lens group G2, it is possible to ensure an optical performance capable of being used in a wide wavelength region from the visible region to the near infrared region. Further, when the aspherical lens is effectively arranged, a high optical performance can be realized by a compact structure while a high aperture ratio is being maintained. For example, the variable power optical system shown in FIG. 1 includes eight lenses including the first lens group G1 of three lenses and the second lens group G2 of five lenses, that is, the variable power optical system shown in FIG. 1 is a compact variable power optical system.

However, the variable power optical system of the present invention is not limited to the number and shape of lenses shown in FIG. 1 but the variable power optical system can be formed into various embodiments like the examples described later. For example, in the variable power optical system of the present invention, the third lens group having a negative refractive power, which is fixed at the time of variable power operation, may be further arranged on the image side of the second lens group G2. When this third lens group is added, the image size can be changed. Therefore, it becomes possible to cope with a change in size of the imaging element. Specifically, it is possible to cope with a change in the imaging element in the case where CCD is changed from 6 mm to 8 mm.

When the variable power optical system of the present invention employs the following preferable embodiments in addition to the constitution described above, it becomes possible to obtain a more excellent optical performance. Preferable embodiments are enumerated as follows.

In the variable power optical system of the present embodiment, it is preferable that the following conditional expression (1) is satisfied:

$$0.7 < f2s/f2 < 2.0 \tag{1}$$

where f2 is a focal length of the second lens group G2 and f2s is a focal length of the sub-lens group G2s.

The conditional expression (1) relates to a ratio of the focal length of the second lens group G2 to the focal length of the sub-lens group G2s. That is, the conditional expression (1) expresses a suitable range of the power ratio of the sub-lens group G2s with respect to the second lens group G2. When the ratio exceeds the upper limit of the conditional expression (1), a positive refractive power of the lens arranged on the image side with respect to the sub-lens group G2s of the second lens group G2 is increased. Accordingly, the spherical aberration is excessively corrected. When the power ratio falls below the lower limit of the conditional expression (1), a positive refractive power of the sub-lens group G2s is increased and the longitudinal chromatic aberration generated in the sub-lens group G2s is increased.

In order to keep balance between the spherical aberration and the longitudinal chromatic aberration, it is preferable that the present variable power optical system satisfies the following conditional expression (1-1). Further, it is preferable that the present variable power optical system satisfies the following conditional expression (1-2):

$$0.8 < f2s/f2 < 1.6 \quad (1\text{-}1)$$

$$0.9 < f2s/f2 < 1.2 \quad (1\text{-}2)$$

In the present variable power optical system, it is preferable that the following conditional expression (2) is satisfied:

$$vd2m > 50.0 \quad (2)$$

where vd2m is an average value of Abbe numbers of the first and the third lens of the sub-lens group G2s at the d-line.

When the average value of the Abbe numbers exceeds the lower limit of the conditional expression (2), the longitudinal chromatic aberration generated in the first and the third lens of the sub-lens group G2s is increased and it becomes difficult to acquire an excellent optical performance in a region from the visible region to the near infrared region.

It is preferable that a positive lens used for the sub-lens group G2s is made of material of low dispersion. Further, in order to acquire an excellent optical performance in a region from the visible region to the near infrared region, it is preferable that the present variable power optical system satisfies the following conditional expression (2-1):

$$vd2m > 65.0 \quad (2\text{-}1)$$

When consideration is given to the characteristic of the material usable for the present optical parts, it is preferable that the following conditional expression (2-2) is satisfied:

$$vd2m < 97.0 \quad (2\text{-}2),$$

where vd2m is an average value of Abbe numbers of the first and the third lens of the sub-lens group G2s at the d-line In the present variable power optical system, it is preferable that a positive lens is arranged on the most image side of the second lens group G2. It is preferable that the following conditional expression (3) is satisfied:

$$vd25 > 65.0 \quad (3)$$

where vd25 is an Abbe number of the positive lens at the d-line. When it exceeds the lower limit of the conditional expression (3), the lateral chromatic aberration is increased.

In the variable power optical system of the present invention, it is preferable that the first lens group G1 includes at least one positive lens, and the following conditional expression (4) is satisfied:

$$vd1p < 21.0 \quad (4)$$

where vd1p is an Abbe number of the at least one positive lens at the d-line. When it exceeds the upper limit of the conditional expression (4), the longitudinal chromatic aberration is increased on the telephoto end side.

In this connection, for example, in the case where the variable power optical system of the present invention is used in a severe environment such as in the open air, it is preferable that the lens arranged on the most object side is resistant to the surface deterioration caused by wind and rain and also resistant to the change in temperature caused by direct rays of the sun. Further, it is preferable that the lens arranged on the most object side is resistant to chemicals such as oil and detergent, that is, it is preferable that the lens arranged on the most object side is made of material having water resistance, weather resistance, oxidation resistance and chemical resistance. Further, it is preferable that the lens arranged on the most object side is made of hard material to be seldom cracked. Due to the foregoing, specifically, it is preferable to use glass. Alternatively, it is possible to use transparent ceramics.

Concerning the material of the lens on which an aspherical shape is formed, it is preferable to use plastics. In this case, the aspherical shape can be accurately formed. Further, it is possible to reduce the weight and the manufacturing cost.

When it is required that the variable power optical system can be used in a wide temperature range, it is preferable that each lens is made of a material having a low coefficient of linear expansion. In the case where the variable power optical system is used in a severe environment, it is preferable that the system is coated with a multiple layer film coat for protection. Except for the coat for protection, a reflection prevention coat film may be used for reducing ghost rays at the time of use.

In the example shown in FIG. 1, the optical member PP is arranged between the lens system and the image formation surface. However, instead of arranging various filters such as a low pass filter or filters to cut a specific wave-length region, these various filters may be arranged between the lenses. Alternatively, a coat having the same function as that of each filter may be applied to a surface of one of the lenses.

As explained above, according to a variable power optical system of the present embodiment, when the above preferable constitution is appropriately employed according to a demanded specification, while the aberration is being excellently corrected in a wide wavelength range from the visible region to the near infrared region, it is possible to reduce the size and increase the aperture ratio. Therefore, an image of high quality can be easily obtained which responds to a camera having imaging elements of not less than one million pixels.

EXAMPLES

Next, specific numerical examples of the variable power optical system of the present embodiment will be explained below.

Example 1

FIG. 1 is a sectional view of the lenses of Example 1. The lens constitution has already been described before. The surface S8 on the object side of the lens L21 on the most object side of the second lens group G2 and the surface S9 on the image side are aspherical. In the aperture stop St, a diameter of the stop is variable and a position is fixed.

Lens data of the variable power optical system of Example 1 is shown on Table 1, aspherical data is shown on Table 2 and various data is shown on Table 3. In this connection, the meanings of reference marks on Tables 1 to 3 described below are the same as those of the examples described later.

In the lens data shown on Table 1, Si is a surface number, the order of which is i (i=1, 2, 3, ... ), wherein the number of the surface of the component on the most object side is the first and this number is increased when it comes to the image side. Ri is a radius of curvature of the surface, the number of which is i. Di is an on-axis surface spacing between the surface, the number of which is i, and the surface, the number of which is i+1, on the optical axis Z. Ndj is the refractive index at the d-line (the wave length 587.6 nm) of the optical element, the number of which is j (J=1, 2, 3, ... ), wherein the number of the lens on the most object side is the first and this number is increased in order when it comes to the image side. In the data on Table 1, vdj is the Abbe Number at the d-line of the optical element, the number of which is j. In this connection, the lens data includes the aperture stop St and the optical member PP. The radius of curvature in the lens data is positive in the case where a surface is convex on the object side and negative in the case where a surface is convex on the image side.

In the lens data shown on Table 1, a surface number of the aspherical surface is attached with the mark *. As a radius of curvature of the aspherical surface, a numerical value of the paraxial radius of curvature is shown. The aspherical data on Table 2 shows an aspherical coefficient with respect to the aspherical surface. "E−n" (n: integer) in values of aspherical data on Table 2 means "×10$^{-n}$". The aspherical coefficient is a value of each coefficient K, Bm (m=3, 4, 5, ... ) in the aspherical expression expressed by the following expression (A).

$$Zd = C \cdot h^2 / \{1 + (1 - k \cdot C^2 \cdot h^2)^{1/2}\} + \Sigma Bm \cdot h^m \quad (A)$$

where

Zd: Depth of aspherical surface (Length of vertical line from the point on the aspherical surface of the height h to the plane perpendicular to the optical axis with which apex of the aspherical surface comes into contact)

h: Height (Distance from the optical axis to the lens surface)

C: Reciprocal of paraxial radius of curvature

K, Bm: Aspherical coefficient (m=3, 4, 5, ... 20)

In the lens data shown on Table 1, variable D1, variable D2 and variable D3 are respectively written in the columns corresponding to the on-axis surface spacing between the first lens group G1 and the aperture stop St, the on-axis surface spacing between the aperture stop St and the second lens group G2 and the on-axis surface spacing between the second lens group G2 and the optical member PP. The above on-axis surface spacing is changed when the variable power operation is executed.

Table 3 shows various data including a focal length of the entire system, F-numbers (Fno.), all angle of view, variable D1, variable D2 and variable D3 at the wide angle end and the telephoto end. The unit of length in the lens data and various data is mm in this case.

TABLE 1

Example 1
Lens Data

| Si | Ri | Di | Ndj | vdj |
|---|---|---|---|---|
| 1 | 37.1224 | 1.97 | 1.83400 | 37.2 |
| 2 | 8.9039 | 5.26 | | |
| 3 | −38.6051 | 4.01 | 1.75500 | 52.3 |
| 4 | 10.6617 | 1.42 | | |
| 5 | 13.7054 | 4.38 | 1.92286 | 18.9 |
| 6 | 36.1942 | Variable D1 | | |
| 7 (Aperture Stop) | — | Variable D2 | | |
| 8* | 18.4695 | 3.17 | 1.56883 | 56.3 |
| 9* | −15.2270 | 0.31 | | |
| 10 | −37.9493 | 0.73 | 1.67270 | 32.1 |
| 11 | 30.2317 | 0.10 | | |
| 12 | 13.3658 | 5.31 | 1.49700 | 81.6 |
| 13 | −13.3449 | 0.10 | | |
| 14 | 45.4835 | 1.39 | 1.63980 | 34.5 |
| 15 | 8.0995 | 0.36 | | |
| 16 | 10.6163 | 3.01 | 1.49700 | 81.6 |
| 17 | −21.9275 | Variable D3 | | |
| 18 | ∞ | 1.50 | 1.51633 | 64.1 |
| 19 | ∞ | | | |

TABLE 2

Example 1
Aspherical Data

S8 (Eighth Surface)

| K | B3 | B4 | B5 | B6 |
|---|---|---|---|---|
| 0.00000E+00 | 1.72747E−04 | −2.54679E−04 | 1.12402E−05 | −1.82340E−06 |

| B7 | B8 | B9 | B10 | B11 |
|---|---|---|---|---|
| −1.79256E−07 | −1.53929E−08 | 1.25146E−09 | −1.42262E−10 | 7.45184E−12 |

| B12 | B13 | B14 | B15 | B16 |
|---|---|---|---|---|
| 2.16834E−12 | 3.24234E−13 | 4.44129E−14 | 3.44817E−15 | 4.05072E−16 |

| B17 | B18 | B19 | B20 |
|---|---|---|---|
| 2.64634E−17 | 8.82929E−19 | 1.34327E−19 | −9.07610E−20 |

TABLE 2-continued

Example 1
Aspherical Data

S9 (Ninth Surface)

| K | B3 | B4 | B5 | B6 |
|---|---|---|---|---|
| 0.00000E+00 | 1.31765E−04 | 3.99720E−05 | 3.69419E−06 | −7.73228E−07 |

| B7 | B8 | B9 | B10 | B11 |
|---|---|---|---|---|
| −1.13942E−07 | −8.00326E−09 | 1.14018E−10 | 1.08014E−10 | 1.60665E−11 |

| B12 | B13 | B14 | B15 | B16 |
|---|---|---|---|---|
| 2.25215E−12 | 2.27225E−13 | 2.69638E−14 | 2.58652E−15 | 3.04876E−16 |

| B17 | B18 | B19 | B20 |
|---|---|---|---|
| 3.49422E−17 | 4.69375E−18 | 5.94509E−19 | 8.07844E−20 |

TABLE 3

Example 1
Various data

| | Focal Length | Fno. | Whole angle of view | Variable D1 | Variable D2 | Variable D3 |
|---|---|---|---|---|---|---|
| Wide Angle End | 2.86 | 1.32 | 130.8 | 15.56 | 6.49 | 1.00 |
| Telephoto End | 5.89 | 1.90 | 58.8 | 4.57 | 1.86 | 5.64 |

Example 2

Figure 2:
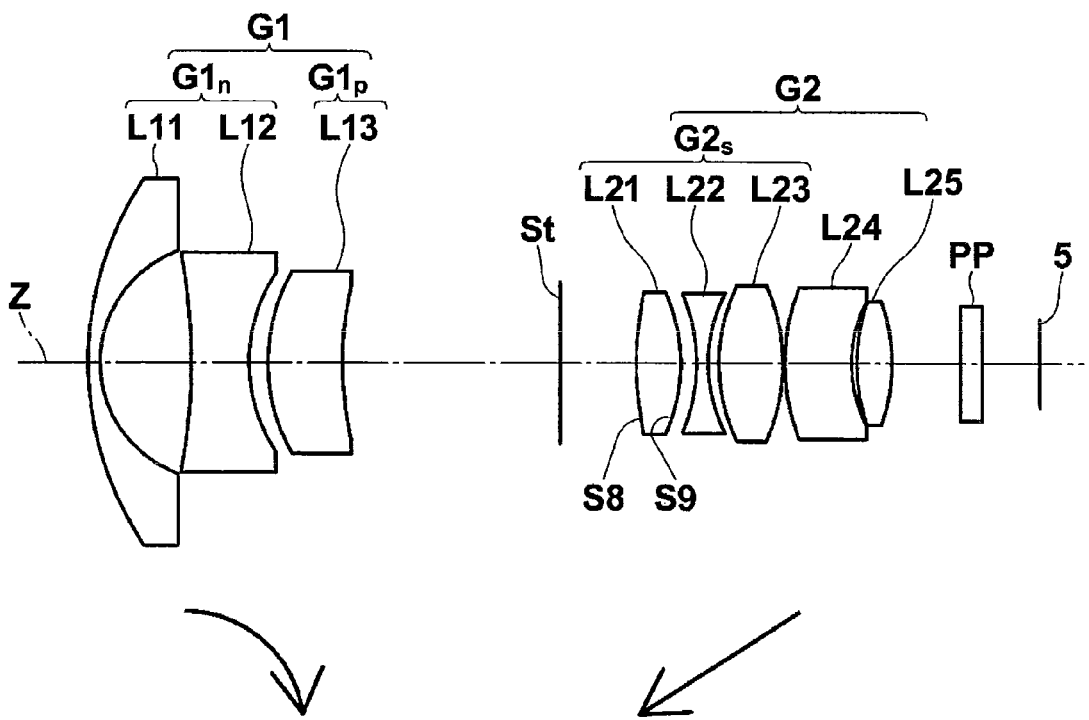
FIG. 2 is a sectional view showing a lens arrangement of a variable power optical system of Example 2 of the present invention.

FIG. 2 is a sectional view of the lenses of Example 2. The variable power optical system of Example 2 includes: a first lens group G1; an aperture stop St; and a second lens group G2. The first lens group G1 includes three lenses including: a negative meniscus lens L11; a biconcave lens L12; and a positive meniscus lens L13. The second lens group G2 includes five lenses including: a biconvex lens L21; a biconcave lens L22; a biconvex lens L23; a negative meniscus lens L24; and a biconvex lens L25. The surface S8 on the object side of the lens L21 and the surface S9 on the image side are aspherical.

The lens data of the variable power optical system of Example 2 is shown on Table 4. The aspherical data is shown on Table 5. Various data is shown on Table 6.

TABLE 4

Example 2
Lens Data

| Si | Ri | Di | Ndj | vdj |
|---|---|---|---|---|
| 1 | 22.7578 | 0.80 | 1.74400 | 44.8 |
| 2 | 8.1329 | 6.19 | | |
| 3 | −40.7710 | 3.89 | 1.69680 | 55.5 |
| 4 | 11.0633 | 1.30 | | |
| 5 | 12.7466 | 5.00 | 1.92286 | 18.9 |
| 6 | 23.4103 | Variable D1 | | |
| 7 (Aperture Stop) | — | Variable D2 | | |
| 8* | 19.0135 | 3.01 | 1.49700 | 81.6 |
| 9* | −11.1959 | 1.08 | | |
| 10 | −12.1299 | 0.74 | 1.58144 | 40.7 |
| 11 | 10.4777 | 0.73 | | |
| 12 | 12.3003 | 4.34 | 1.49700 | 81.6 |
| 13 | −13.1361 | 0.10 | | |
| 14 | 14.2803 | 4.51 | 1.92286 | 18.9 |
| 15 | 9.6096 | 0.35 | | |
| 16 | 14.3425 | 2.31 | 1.60300 | 65.5 |
| 17 | −13.2214 | Variable D3 | | |
| 18 | ∞ | 1.50 | 1.51633 | 64.1 |
| 19 | ∞ | | | |

TABLE 5

Example 2
Aspherical Data

S8 (Eighth Surface)

| K | B3 | B4 | B5 | B6 |
|---|---|---|---|---|
| 0.00000E+00 | 2.44724E−04 | −2.33092E−04 | 1.16791E−05 | −1.66749E−06 |

| B7 | B8 | B9 | B10 | B11 |
|---|---|---|---|---|
| −1.47365E−07 | −1.04395E−08 | 1.73298E−09 | −9.35992E−11 | 1.08869E−11 |

TABLE 5-continued

Example 2
Aspherical Data

| B12 | B13 | B14 | B15 | B16 |
|---|---|---|---|---|
| 2.41942E−12 | 3.34946E−13 | 4.44167E−14 | 3.35799E−15 | 3.87267E−16 |

| B17 | B18 | B19 | B20 |
|---|---|---|---|
| 2.44926E−17 | 6.64623E−19 | 1.26151E−19 | −9.29399E−20 |

S9 (Ninth Surface)

| K | B3 | B4 | B5 | B6 |
|---|---|---|---|---|
| 0.00000E+00 | 2.30490E−04 | −7.73117E−06 | 3.12934E−06 | −7.09120E−07 |

| B7 | B8 | B9 | B10 | B11 |
|---|---|---|---|---|
| −1.21018E−07 | −1.09412E−08 | −2.98773E−10 | 5.46578E−11 | 1.13428E−11 |

| B12 | B13 | B14 | B15 | B16 |
|---|---|---|---|---|
| 1.79471E−12 | 1.95063E−13 | 2.44619E−14 | 2.45157E−15 | 2.99871E−16 |

| B17 | B18 | B19 | B20 |
|---|---|---|---|
| 3.45720E−17 | 4.67422E−18 | 5.98356E−19 | 8.18140E−20 |

TABLE 6

Example 2
Various data

| | Focal Length | Fno. | Whole angle of view | Variable D1 | Variable D2 | Variable D3 |
|---|---|---|---|---|---|---|
| Wide Angle End | 2.86 | 1.33 | 127.0 | 14.66 | 5.22 | 1.00 |
| Telephoto End | 5.89 | 1.81 | 58.7 | 2.47 | 0.99 | 5.22 |

Example 3

Figure 3:
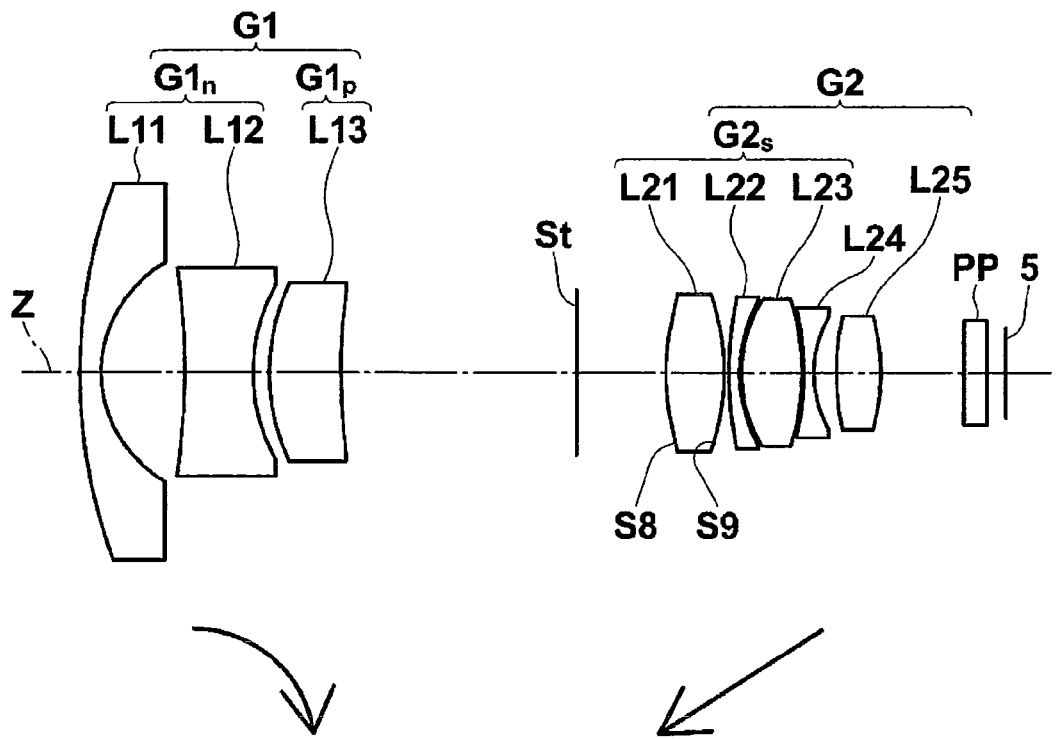
FIG. 3 is a sectional view showing a lens arrangement of a variable power optical system of Example 3 of the present invention.

FIG. 3 is a sectional view showing a lens of Example 3. The variable power optical system of Example 3 includes: a first lens group G1; an aperture stop St and a second lens group G2. The first lens group G1 includes three lenses including a negative meniscus lens L11, a biconcave lens L12 and a positive meniscus lens L13. The second lens group G2 includes five lenses including a biconvex lens L21, a negative meniscus lens L22, a biconvex lens L23, a biconcave lens L24, a biconcave lens L24 and a biconvex lens L25. The surface S8 on the object side of the lens L21 and the surface S9 on the image side are aspherical.

The lens data of the variable power optical system of Example 3 is shown on Table 7, the aspherical data is shown on Table 8 and various data is shown on Table 9.

TABLE 7

Example 3
Lens Data

| Si | Ri | Di | Ndj | vdj |
|---|---|---|---|---|
| 1 | 36.1826 | 1.40 | 1.83400 | 37.2 |
| 2 | 8.4538 | 5.44 | | |
| 3 | −47.5284 | 4.46 | 1.75500 | 52.3 |
| 4 | 12.1122 | 1.07 | | |
| 5 | 14.1422 | 4.73 | 1.92286 | 18.9 |
| 6 | 40.3749 | Variable D1 | | |
| 7 (Aperture Stop) | — | Variable D2 | | |
| 8* | 14.3517 | 3.85 | 1.49700 | 81.6 |
| 9* | −15.1556 | 0.30 | | |
| 10 | 24.1599 | 0.73 | 1.62004 | 36.3 |
| 11 | 10.1903 | 0.10 | | |
| 12 | 9.2620 | 4.03 | 1.69680 | 55.5 |
| 13 | −16.1696 | 0.10 | | |
| 14 | −20.5252 | 0.65 | 1.6727 | 32.1 |
| 15 | 7.8110 | 1.47 | | |
| 16 | 16.5367 | 2.93 | 1.60300 | 65.5 |
| 17 | −14.1593 | Variable D3 | | |
| 18 | ∞ | 1.50 | 1.51633 | 64.1 |
| 19 | ∞ | | | |

TABLE 8

Example 3
Aspherical Data

S8 (Eighth Surface)

| K | B3 | B4 | B5 | B6 |
|---|---|---|---|---|
| 0.00000E+00 | 1.47283E−04 | −2.63641E−04 | 1.20076E−05 | −1.69635E−06 |
| B7 | B8 | B9 | B10 | B11 |
| −1.71002E−07 | −1.51358E−08 | 1.20874E−09 | −1.53767E−10 | 5.92060E−12 |
| B12 | B13 | B14 | B15 | B16 |
| 1.95840E−12 | 3.03165E−13 | 4.19745E−14 | 3.23021E−15 | 3.81968E−16 |
| B17 | B18 | B19 | B20 | |
| 2.46801E−17 | 7.54887E−19 | 1.43115E−19 | −8.91917E−20 | |

S9 (Ninth Surface)

| K | B3 | B4 | B5 | B6 |
|---|---|---|---|---|
| 0.00000E+00 | 1.01869E−04 | 4.77370E−05 | 2.55915E−06 | −9.21775E−07 |
| B7 | B8 | B9 | B10 | B11 |
| −1.20460E−07 | −7.82072E−09 | 1.95194E−10 | 1.21725E−10 | 1.75257E−11 |
| B12 | B13 | B14 | B15 | B16 |
| 2.42255E−12 | 2.42242E−13 | 2.85144E−14 | 2.71202E−15 | 3.17105E−16 |
| B17 | B18 | B19 | B20 | |
| 3.58822E−17 | 4.80204E−18 | 6.02911E−19 | 8.65694E−20 | |

TABLE 9

Example 3
Various data

| | Focal Length | Fno. | Whole angle of view | Variable D1 | Variable D2 | Variable D3 |
|---|---|---|---|---|---|---|
| Wide Angle End | 2.86 | 1.42 | 129.8 | 15.57 | 5.87 | 1.00 |
| Telephoto End | 5.89 | 1.87 | 58.7 | 3.51 | 1.68 | 5.19 |

Example 4

Figure 4:
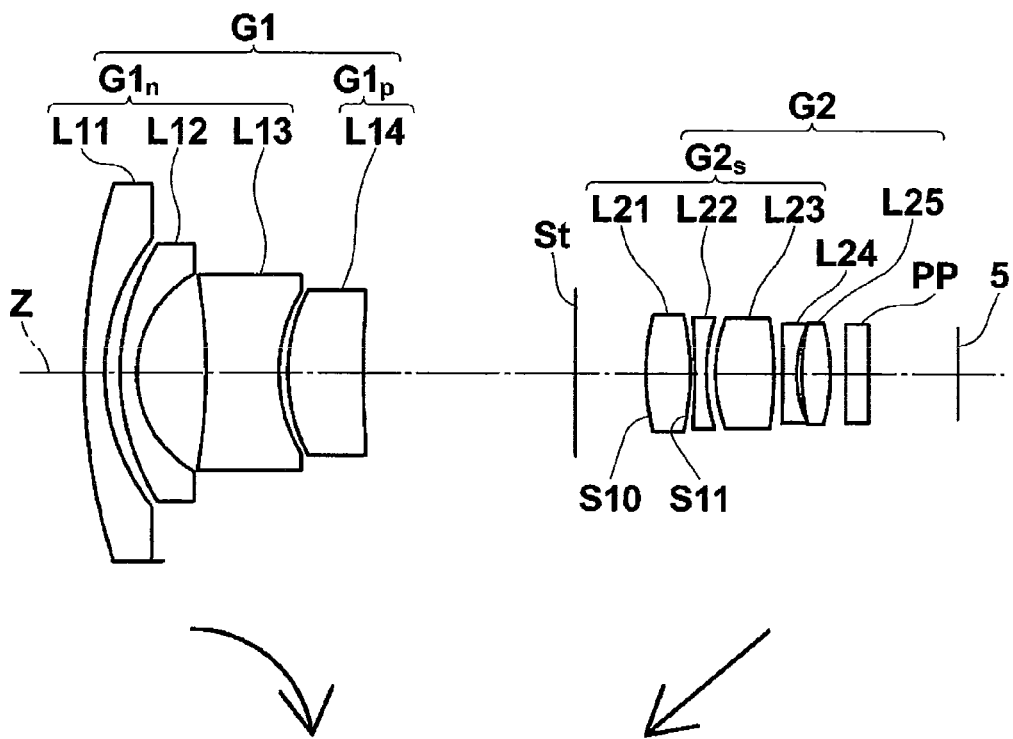
FIG. 4 is a sectional view showing a lens arrangement of a variable power optical system of Example 4 of the present invention.

FIG. 4 is a sectional view showing a lens of Example 4. The variable power optical system of Example 4 includes: a first lens group G1; an aperture stop St and a second lens group G2. The first lens group G1 includes four lenses including a negative meniscus lens L11, a negative meniscus lens L12, a biconcave lens L13 and a positive meniscus lens L14. The second lens group G2 includes five lenses including a biconvex lens L21, a biconcave lens L22, a biconvex lens L23, a biconcave lens L24 and a biconvex lens L25. The surface S10 on the object side of the lens L21 of Example 4 and the surface S11 on the image side are aspherical.

The lens data of the variable power optical system of Example 4 is shown on Table 10, the aspherical data is shown on Table 11 and various data is shown on Table 12.

TABLE 10

Example 4
Lens Data

| Si | Ri | Di | Ndj | vdj |
|---|---|---|---|---|
| 1 | 41.4272 | 1.35 | 1.76182 | 26.5 |
| 2 | 14.2111 | 1.00 | | |
| 3 | 15.8250 | 1.09 | 1.60342 | 38.0 |
| 4 | 7.6369 | 4.52 | | |
| 5 | −36.8749 | 4.75 | 1.80400 | 46.6 |
| 6 | 10.4317 | 0.60 | | |
| 7 | 11.7833 | 5.00 | 1.92286 | 20.9 |
| 8 | 71.2331 | Variable D1 | | |
| 9 (Aperture Stop) | — | Variable D2 | | |
| 10* | 14.3586 | 2.93 | 1.63854 | 55.4 |
| 11* | −15.3569 | 0.30 | | |
| 12 | −51.2224 | 0.73 | 1.67270 | 32.1 |
| 13 | 12.1609 | 0.60 | | |
| 14 | 10.2732 | 3.89 | 1.72916 | 54.7 |
| 15 | −23.6622 | 0.54 | | |
| 16 | −484.2549 | 0.97 | 1.72825 | 28.5 |
| 17 | 8.0392 | 0.30 | | |
| 18 | 13.2769 | 1.88 | 1.60300 | 65.5 |
| 19 | −12.0583 | Variable D3 | | |
| 20 | ∞ | 1.50 | 1.51633 | 64.1 |
| 21 | ∞ | | | |

TABLE 11

Example 4
Aspherical Data

S10 (Tenth Surface)

| K | RB3 | RB4 | RB5 | RB6 |
|---|---|---|---|---|
| 0.00000E+00 | 1.88795E-04 | -2.58127E-04 | 1.30813E-05 | -1.60661E-06 |

| RB7 | RB8 | RB9 | RB10 | RB11 |
|---|---|---|---|---|
| -1.62816E-07 | -1.41400E-08 | 1.29805E-09 | -1.44491E-10 | 6.70866E-12 |

| RB12 | RB13 | RB14 | RB15 | RB16 |
|---|---|---|---|---|
| 2.04702E-12 | 3.11781E-13 | 4.30636E-14 | 3.34175E-15 | 3.96259E-16 |

| RB17 | RB18 | RB19 | RB20 |
|---|---|---|---|
| 2.63562E-17 | 8.40546E-19 | 1.60410E-19 | -9.37745E-20 |

S11 (Eleventh Surface)

| K | RB3 | RB4 | RB5 | RB6 |
|---|---|---|---|---|
| 0.00000E+00 | 1.85326E-04 | 9.51045E-05 | 5.38225E-06 | -8.00665E-07 |

| RB7 | RB8 | RB9 | RB10 | RB11 |
|---|---|---|---|---|
| -1.31723E-07 | -1.12934E-08 | -2.46157E-10 | 6.67308E-11 | 1.25969E-11 |

| RB12 | RB13 | RB14 | RB15 | RB16 |
|---|---|---|---|---|
| 1.91322E-12 | 2.01274E-13 | 2.45417E-14 | 2.40193E-15 | 2.87232E-16 |

| RB17 | RB18 | RB19 | RB20 |
|---|---|---|---|
| 3.44890E-17 | 4.45999E-18 | 5.93480E-19 | 7.17151E-20 |

TABLE 12

Example 4
Various data

| | Focal Length | Fno. | Whole angle of view | Variable D1 | Variable D2 | Variable D3 |
|---|---|---|---|---|---|---|
| Wide Angle End | 2.86 | 1.60 | 130.7 | 13.96 | 4.61 | 1.00 |
| Telephoto End | 5.89 | 2.11 | 58.5 | 2.36 | 1.00 | 4.61 |

Example 5

Figure 5:
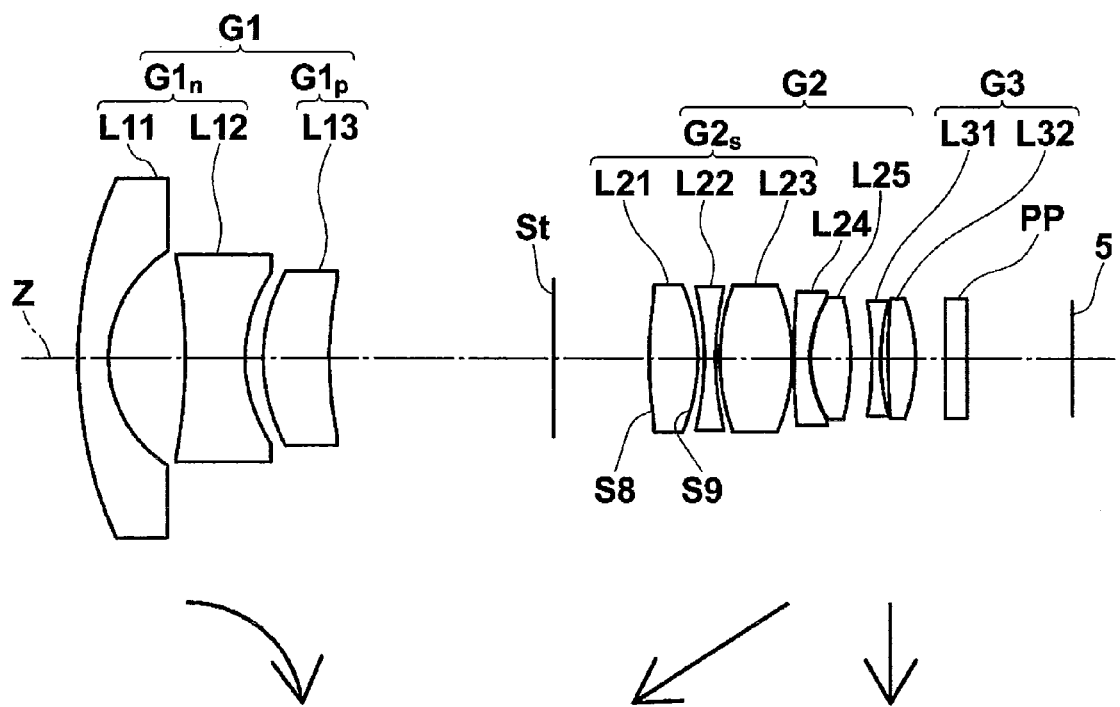
FIG. 5 is a sectional view showing a lens arrangement of a variable power optical system of Example 5 of the present invention.

FIG. 5 is a sectional view showing a lens of Example 5. The variable power optical system of Example 5 includes: a first lens group G1; an aperture stop St, a second lens group G2; and a third lens group G3. The first lens group G1 includes three lenses including a negative meniscus lens L11, a biconcave lens L12 and a positive meniscus lens L13. The second lens group G2 includes five lenses including a biconvex lens L21, a biconcave lens L22, a biconvex lens L23, a negative meniscus lens L24 and a biconvex lens L25. The third lens group G3 is a stationary group not moving at the time of variable power operation. The third lens group G3 is formed out of two lenses including a biconcave lens L31 and a biconvex lens L32. In Example 5, variable D3 is different from that of the above example. Variable D3 is an on-axis surface spacing between the second lens group G2 and the third lens group G3. The surface S8 on the object side of the lens L21 and the surface S9 on the image side are aspherical.

The lens data of the variable power optical system of Example 5 is shown on Table 13, the aspherical data is shown on Table 14 and various data is shown on Table 15.

TABLE 13

Example 5
Lens Data

| Si | Ri | Di | Ndj | vdj |
|---|---|---|---|---|
| 1 | 31.8550 | 2.01 | 1.83400 | 37.2 |
| 2 | 8.9333 | 5.29 | | |
| 3 | -38.8976 | 4.10 | 1.69680 | 55.5 |
| 4 | 10.8889 | 1.22 | | |
| 5 | 12.4484 | 4.63 | 1.92286 | 18.9 |
| 6 | 26.1046 | Variable D1 | | |
| 7 (Aperture Stop) | — | Variable D2 | | |
| 8* | 25.4618 | 3.41 | 1.58313 | 59.4 |
| 9* | -12.4529 | 0.46 | | |
| 10 | -21.1674 | 0.80 | 1.54814 | 45.8 |
| 11 | 21.7934 | 0.26 | | |
| 12 | 14.5808 | 5.03 | 1.49700 | 81.6 |
| 13 | -13.3508 | 0.10 | | |
| 14 | 53.5169 | 1.10 | 1.67270 | 32.1 |
| 15 | 8.3499 | 0.10 | | |
| 16 | 8.6403 | 2.71 | 1.49700 | 81.6 |
| 17 | -17.9619 | Variable D3 | | |
| 18 | -23.3272 | 0.60 | 1.80440 | 39.6 |
| 19 | 14.8915 | 0.50 | | |
| 20 | 57.4134 | 1.84 | 1.72825 | 28.5 |
| 21 | -13.0017 | 1.00 | | |
| 22 | ∞ | 1.50 | 1.51633 | 64.1 |
| 23 | ∞ | | | |

TABLE 14

Example 5

Aspherical Data

S8 (Eighth Surface)

| K | RB3 | RB4 | RB5 | RB6 |
|---|---|---|---|---|
| 0.00000E+00 | 1.67268E−04 | −2.50948E−04 | 1.11580E−05 | −1.83787E−06 |
| RB7 | RB8 | R89 | RB10 | RB11 |
| −1.78559E−07 | −1.50425E−08 | 1.30216E−09 | −1.35370E−10 | 8.11746E−12 |
| RB12 | RB13 | RB14 | RB15 | RB16 |
| 2.24183E−12 | 3.30533E−13 | 4.50683E−14 | 3.50197E−15 | 4.10541E−16 |
| RB17 | RB18 | RB19 | RB20 | |
| 2.70059E−17 | 9.62710E−19 | 1.47633E−19 | −9.20429E−20 | |

S9 (Ninth Surface)

| K | RB3 | RB4 | RB5 | RB6 |
|---|---|---|---|---|
| 0.00000E+00 | 1.22865E−04 | 3.31215E−05 | 3.73805E−06 | −7.31192E−07 |
| RB7 | RB8 | RB9 | RB10 | RB11 |
| −1.11033E−07 | −8.03812E−09 | 7.15471E−11 | 9.91870E−11 | 1.49662E−11 |
| RB12 | RB13 | RB14 | RB15 | RB16 |
| 2.10407E−12 | 2.12279E−13 | 2.51915E−14 | 2.42073E−15 | 2.86346E−16 |
| RB17 | RB18 | RB19 | RB20 | |
| 3.32383E−17 | 4.50792E−18 | 5.69625E−19 | 7.77589E−20 | |

Various data

| | Focal Length | Fno. | Whole angle of view | Variable D1 | Variable D2 | Variable D3 |
|---|---|---|---|---|---|---|
| Wide Angle End | 3.81 | 1.77 | 124.2 | 15.45 | 6.56 | 1.46 |
| Telephoto End | 7.85 | 2.39 | 57.6 | 3.88 | 2.02 | 6.01 |

Table 16 shows values corresponding to the conditional expressions (1) to (4) in Examples 1 to 5. As can be seen on Table 16, any of Examples 1 to 5 satisfies the conditional expressions (1) to (4).

TABLE 16

| | Example 1 | Example 2 | Example 3 | Example 4 | Example 5 |
|---|---|---|---|---|---|
| Conditional Expression (1) f2s/f2 | 0.99 | 1.94 | 0.71 | 0.96 | 1.10 |
| Conditional Expression (2) vd2m | 69.0 | 81.6 | 68.6 | 55.1 | 70.5 |
| Conditional Expression (3) vd2S | 81.6 | 65.5 | 65.5 | 65.5 | 81.6 |
| Conditional Expression (4) vd1p | 18.9 | 18.9 | 18.9 | 20.9 | 18.9 |

Figure 6:
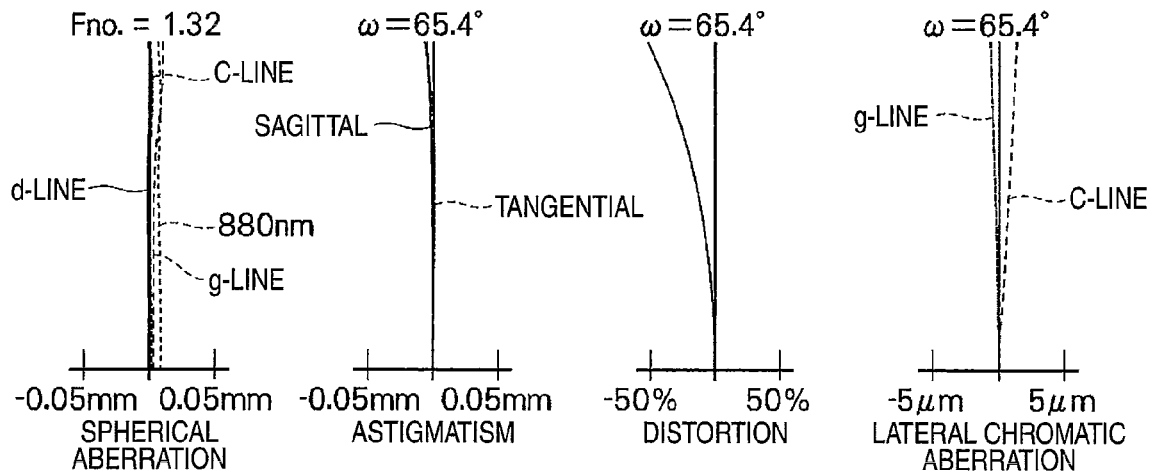
FIG. 6 is aberration diagrams of a variable power optical system of Example 1 of the present invention.
Figure 6:
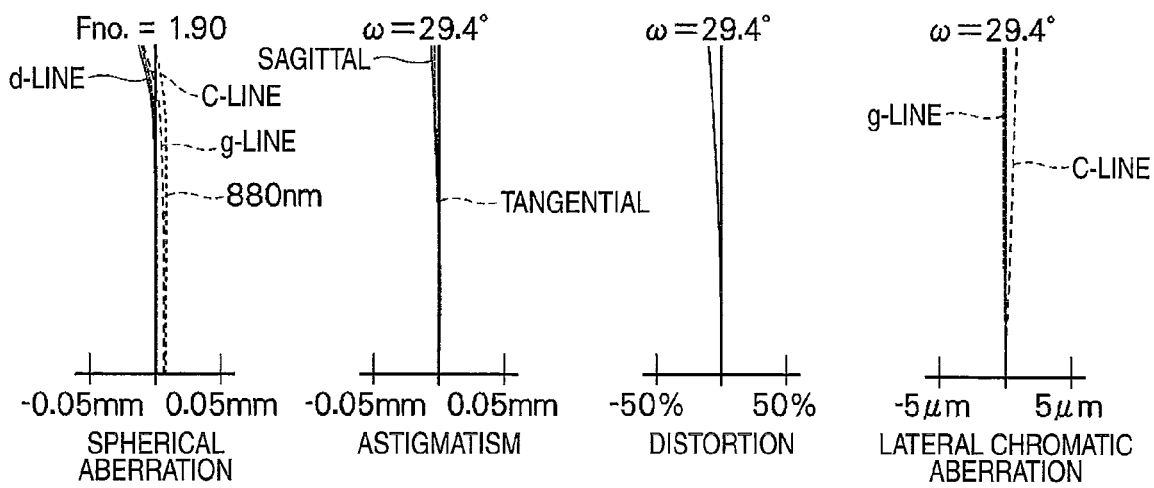
Figure 7:
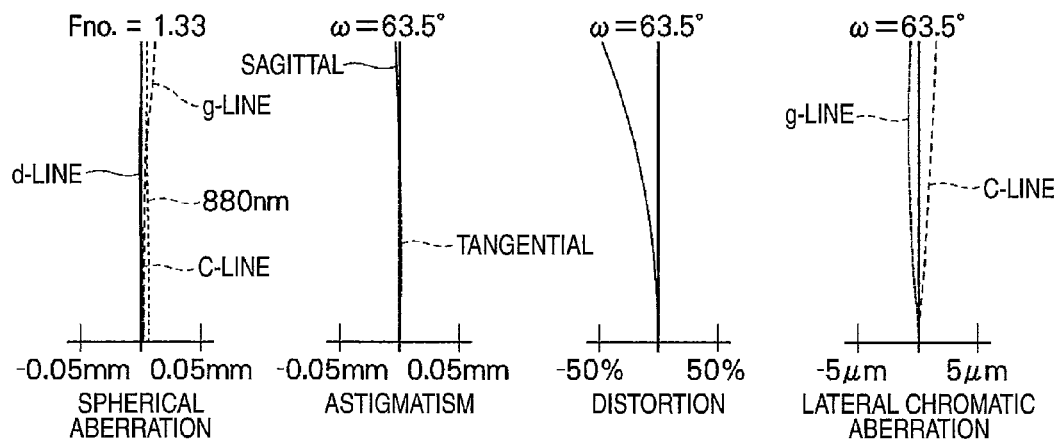
FIG. 7 is aberration diagrams of a variable power optical system of Example 2 of the present invention.
Figure 7:
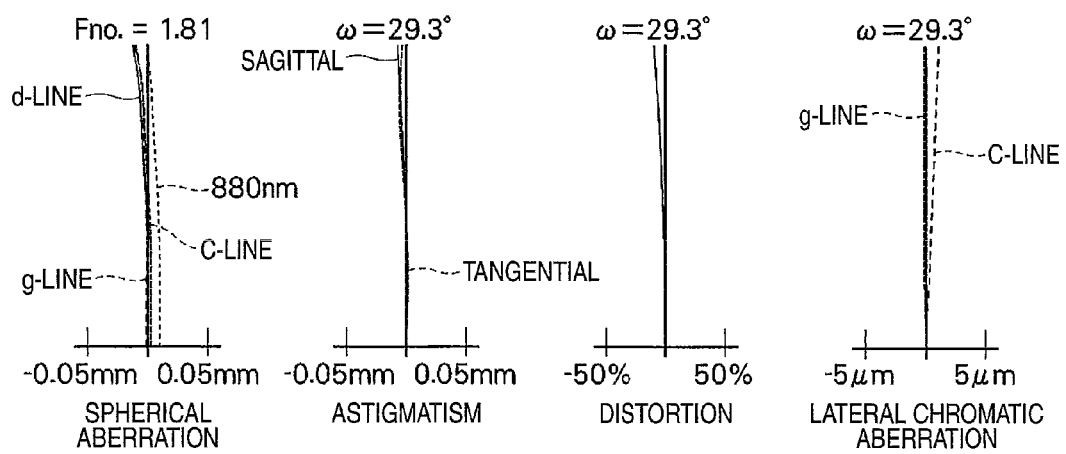
Figure 8:
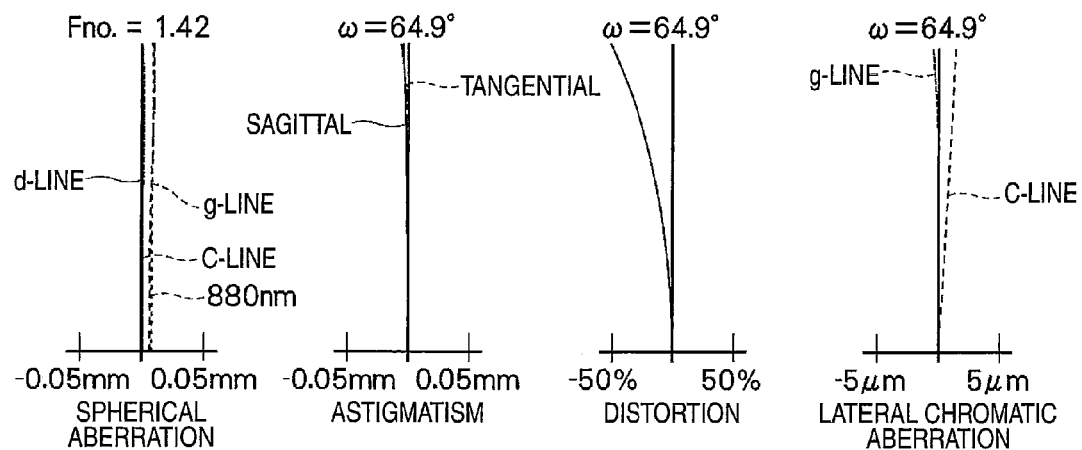
FIG. 8 is aberration diagrams of a variable power optical system of Example 3 of the present invention.
Figure 8:
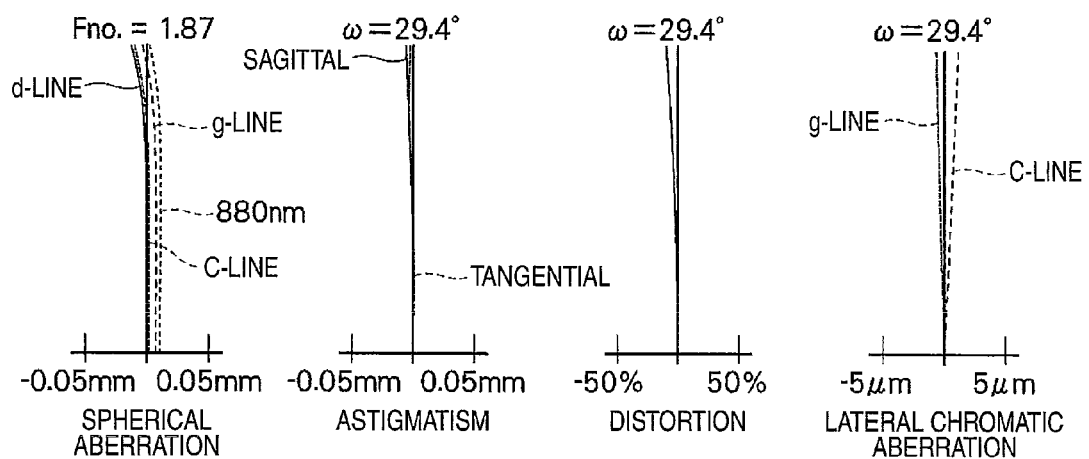
Figure 9:
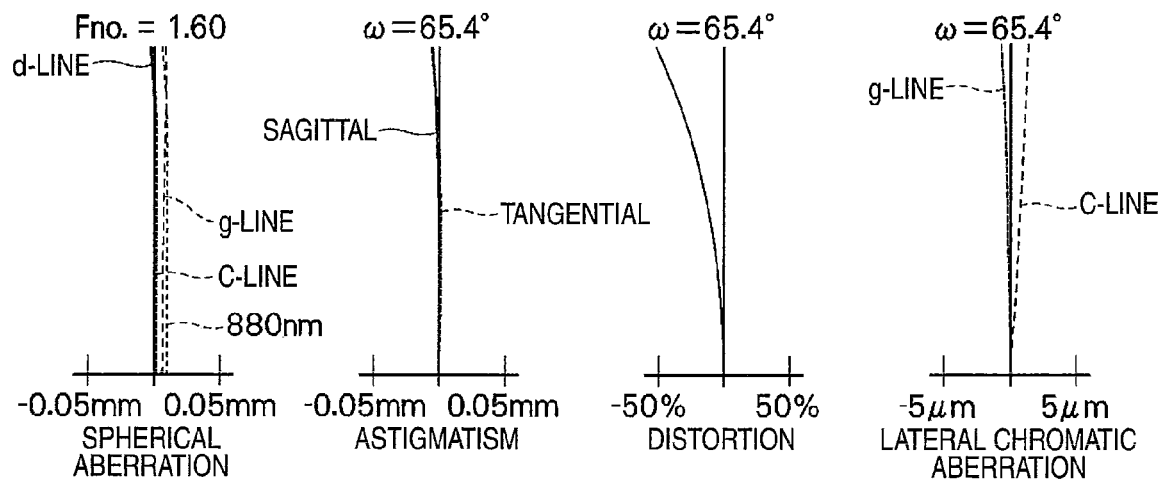
FIG. 9 is aberration diagrams of a variable power optical system of Example 4 of the present invention.
Figure 9:
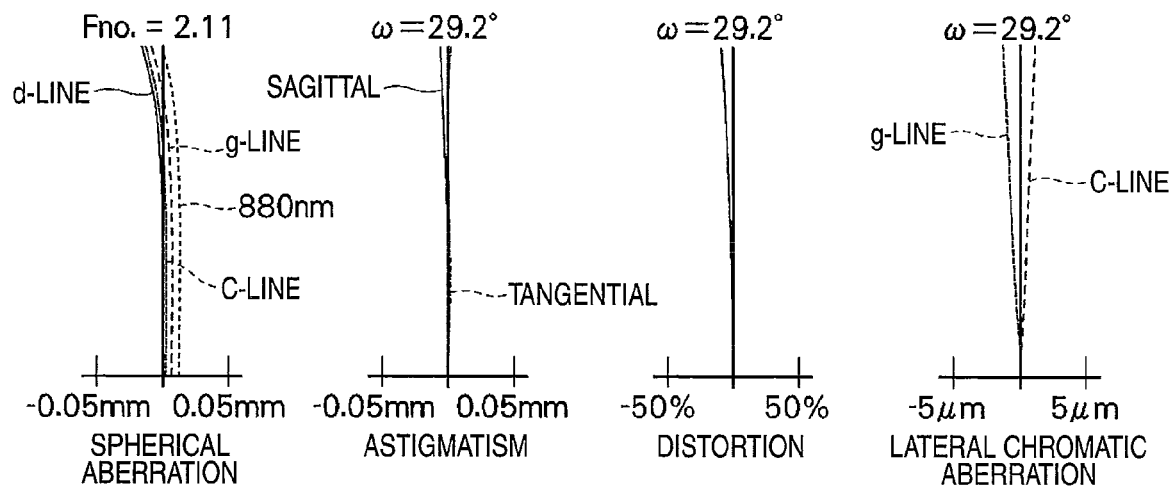
Figure 10:
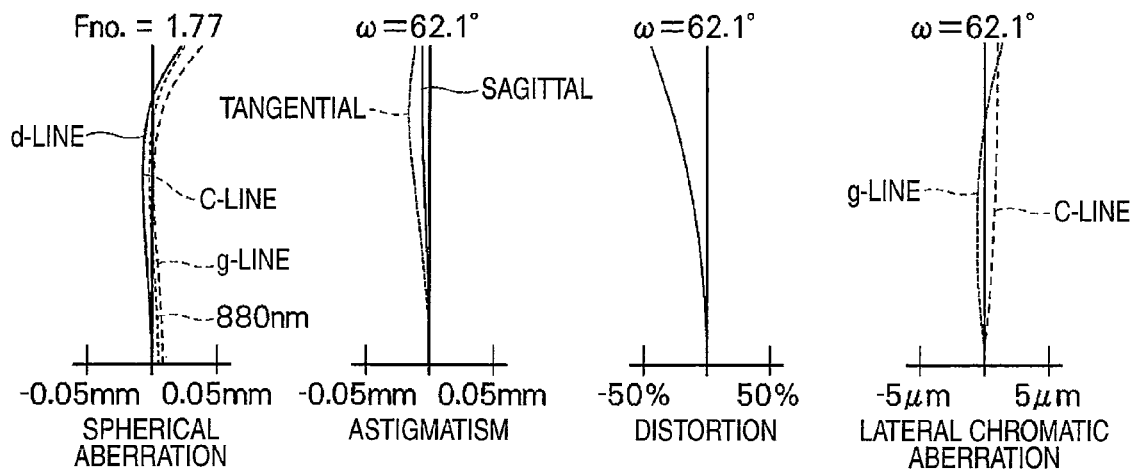
FIG. 10 is aberration diagrams of a variable power optical system of Example 5 of the present invention.
Figure 10:
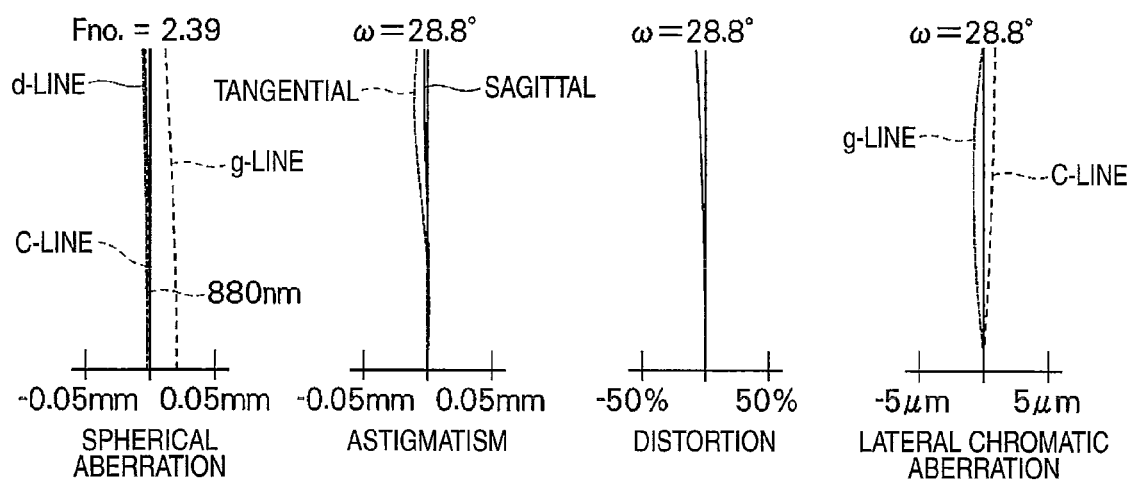

FIG. 6 is aberration diagrams showing spherical aberration, astigmatism, distortion, and lateral chromatic aberration, generated at a wide angle end and a telephoto end of the variable power optical system of Example 1. In the aberration diagrams shown in FIG. 6, the upper diagrams at the wide angle end are attached with reference mark WIDE and the lower diagrams at the telephoto end are attached with reference mark TELE. In each aberration diagram, the aberrations at the d-line are shown. However, in the spherical aberration diagram, the aberration at the g-line (the wavelength 436 nm), the aberration at the C-line (the wavelength 656.3 nm) and the aberration at the wavelength 880 nm are shown. Fno shown in the spherical aberration diagram represents F-number and c shown in the astigmatism diagram and the distortion diagram represents a half angle of view.

Similarly, FIGS. 7 to 10 are aberration diagrams showing spherical aberration, astigmatism, distortion, and lateral chromatic aberration, generated at a wide angle end and a telephoto end of the variable power optical systems of Examples 2 to 5.

From the above data, the following can be understood. In Examples 1 to 5, in the variable power optical system, the magnifying power of which is approximately 2, the optical system is made compact and the aperture ratio of the lens system is high in which the F-number at the wide angle end is 1.32 to 1.77, that is, the lens system is fast. Further, the aberration is excellently corrected and the optical performance is high in a wide wavelength region from the visible region to the near infrared region at both the wide angle end and the telephoto end.

Figure 11:
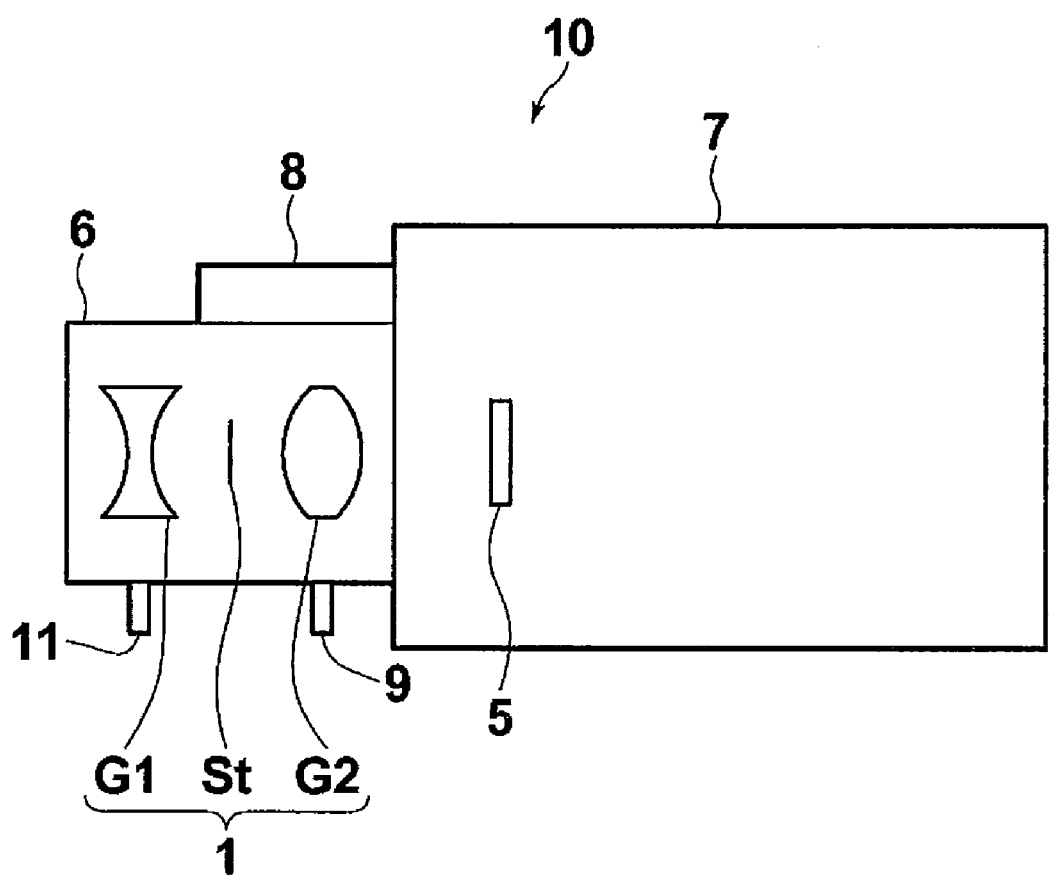
FIG. 11 is a sectional view briefly showing an imaging device according to an exemplary embodiment of the present invention.

FIG. 11 is an arrangement view showing an outline of a surveillance camera, which is an imaging device, to which a variable power optical system of the present invention is applied. The surveillance camera 10 shown in FIG. 11 includes a lens unit 6 and a camera body 7. In the lens unit 6, the variable power optical system 1 of the embodiment of the present invention is arranged. In this connection, FIG. 11 briefly shows the variable power optical system 1 having the first lens group G1, the aperture stop St and the second lens group G2.

The imaging element 5 for taking an image of an object formed by the variable power optical system 1 is arranged in the camera body 7. Specific examples of the imaging element 5 are: CCD (Charge Coupled Device) and CMOS (Complementary Metal Oxide Semiconductor) for converting an optical image formed by the variable power optical system into an electric signal. The imaging element 5 is arranged so that the imaging plane can agree with an image formation plane of the variable power optical system 1.

The stop mechanism 8 for changing a stop diameter of the aperture stop St is arranged above the lens unit 6. Below the lens unit 6, the zooming knob 9 for changing a magnifying power of the variable power optical system 1 and the focusing knob 11 for adjusting a focus of the variable power optical system 1 are arranged.

The variable power optical system 1 of the embodiment of the present invention has the above advantages. Therefore, the imaging device of the present embodiment can be made compact and excellently used even under a photographing condition of low illuminance and further it is possible to obtain an image of high quality in a wide wavelength region from the visible region to the near infrared region.

The present invention has been explained above referring to the embodiments and examples. However, it should be noted that present invention is not limited to the above specific embodiments and examples but variations can be made. For example, the values of the radius of curvature of each lens component, the on-axis surface spacing between the faces and the refraction factor are not limited to the values shown in the above examples but it is possible to use other values.

In the embodiment described above, the imaging device is applied to a surveillance camera. However, the present invention is not limited to the specific example. For example, the imaging device can be applied to other imaging devices such as a video camera and an electronic still camera.

What is claimed is:

1. A variable power optical system comprising: in order from an object side thereof,
a first lens group having a negative refractive power and including a negative lens group and a positive lens group in order from the object side;
a stop; and
a second lens group having a positive refractive power and including a sub-lens group having a positive refractive power as a whole and arranged on the most object side thereof, the sub-lens group including, in order from the object side, a first lens having a positive refractive power having at least one aspherical surface, a second lens having a negative refractive power, and a third lens having a positive refractive power,
wherein
the second lens group includes five lenses including the sub-lens group, a negative meniscus lens having a concave surface on the image side, and a positive lens in order from the object side,
the second lens group is moved to the object side along an optical axis thereof to perform a variable power operation from a wide angle end to a telephoto end of the variable power optical system, and the first lens group is moved to make a correction of an image plane position in accordance with the variable power operation,
wherein
the first lens of the sub-lens group is a biconvex lens, the second lens of the sub-lens group is a biconcave lens, and the third lens of the sub-lens group is a biconvex lens, and
wherein
an air distance along the optical axis exists between the first and second lens.

2. The variable power optical system according to claim 1, satisfying conditional expression (2):

$$vd2m > 50.0 \quad (2)$$

wherein vd2m is an average value of Abbe numbers in the first and the third lens at the d-line.

3. The variable power optical system according to claim 1, wherein the first lens group includes at least one positive lens and satisfies conditional expression (4), $$vd1p < 21.0 \quad (4)$$

wherein vd1p is an Abbe number of the at least one positive lens at the d-line.

4. The variable power optical system according to claim 1, further comprising a third lens group having a negative refractive power and arranged on the image side of the second lens group, the third lens group being fixed at a time of the variable power operation.

5. An imaging device comprising:
a variable power optical system according to claim 1; and
an imaging element for taking an object image formed by the variable power optical system.

6. The variable power optical system according to claim 1, satisfying conditional expression (1):

$$0.7 < f2s/f2 < 2.0 \quad (1)$$

wherein f2 is a focal length of the second lens group and f2s is a focal length of the sub-lens group.

7. The variable power optical system according to claim 6, satisfying conditional expression (2):

$$vd2m > 50.0 \quad (2)$$

wherein vd2m is an average value of Abbe numbers in the first and the third lens at the d-line.

8. The variable power optical system according to claim 6, wherein the second lens group includes a positive lens on the most image side thereof, and the positive lens satisfies conditional expression (3):

$$vd25 > 65.0 \quad (3)$$

wherein vd25 is an Abbe number of the positive lens at the d-line.

9. The variable power optical system according to claim 6, wherein the first lens of the sub-lens group is a biconvex lens, the second lens of the sub-lens group is a biconcave lens, and the third lens of the sub-lens group is a biconvex lens, and
the second lens group includes five lenses including the sub-lens group, a negative meniscus lens having a concave surface on the image side, and a positive lens in order from the object side.

10. The variable power optical system according to claim 6, wherein the first lens group includes three lenses including a negative meniscus lens, a biconcave lens having a negative refractive power, and a positive lens in order from the object side.

11. The variable power optical system according to claim 6, wherein the first lens group includes four lenses including a negative meniscus lens, another negative meniscus lens, a biconcave lens having a negative refractive power, and a positive lens in order from the object side.

12. The variable power optical system according to claim 6, wherein the first lens group includes at least one positive lens and satisfies conditional expression (4), $$vd1p<21.0 \tag{4}$$

wherein vd1p is an Abbe number of the at least one positive lens at the d-line.

13. The variable power optical system according to claim 2, further comprising a third lens group having a negative refractive power and arranged on the image side of the second lens group, the third lens group being fixed at a time of the variable power operation.

14. An imaging device comprising:
   a variable power optical system according to claim 6; and
   an imaging element for taking an object image formed by the variable power optical system.

15. A variable power optical system comprising: in order from an object side thereof,
   a first lens group having a negative refractive power and including a negative lens group and a positive lens group in order from the object side:
   a stop; and
   a second lens group having a positive refractive power and including a sub-lens group having a positive refractive power as a whole and arranged on the most object side thereof, the sub-lens group including, in order from the object side, a first lens having a positive refractive power having at least one aspherical surface, a second lens having a negative refractive power, and a third lens having a positive refractive power,
   wherein
   the second lens group is moved to the object side along an optical axis thereof to perform a variable power operation from a wide angle end to a telephoto end of the variable power optical system, and the first lens group is moved to make a correction of an image plane position in accordance with the variable power operation,
   wherein
   the first lens of the sub-lens group is a biconvex lens, the second lens of the sub-lens group is a biconcave lens, and the third lens of the sub-lens group is a biconvex lens,
   wherein
   an air distance along the optical axis exists between the first and second lens, and
   wherein the second lens group includes a positive lens on the most image side thereof, and the positive lens satisfies conditional expression (3):

$$vd25>65.0 \tag{3}$$

wherein vd25 is an Abbe number of the positive lens at the d-line.

16. A variable power optical system comprising: in order from an object side thereof,
   a first lens group having a negative refractive power and including a negative lens group and a positive lens group in order from the object side;
   a stop; and
   a second lens group having a positive refractive power and including a sub-lens group having a positive refractive power as a whole and arranged on the most object side thereof, the sub-lens group including, in order from the object side, a first lens having a positive refractive power having at least one aspherical surface, a second lens having a negative refractive power, and a third lens having a positive refractive power,
   wherein
   the second lens group is moved to the object side along an optical axis thereof to perform a variable power o eration from a wide angle end to a telephoto end of the variable power optical system, and the first lens group is moved to make a correction of an image plane position in accordance with the variable power operation,
   wherein
   the first lens of the sub-lens group is a biconvex lens, the second lens of the sub-lens group is a biconcave lens, and the third lens of the sub-lens group is a biconvex lens,
   wherein
   an air distance along the optical axis exists between the first and second lens, and
   wherein the first lens group includes three lenses including a negative meniscus lens, a biconcave lens having a negative refractive power, and a positive lens in order from the object side.

17. A variable power optical system comprising: in order from an object side thereof,
   a first lens group having a negative refractive power and including a negative lens group and a positive lens group in order from the object side;
   a stop; and
   a second lens group having a positive refractive power and including a sub-lens group having a positive refractive power as a whole and arranged on the most object side thereof, the sub-lens group including, in order from the object side, a first lens having a positive refractive power having at least one aspherical surface, a second lens having a negative refractive power, and a third lens having a positive refractive power,
   wherein
   the second lens group is moved to the object side along an optical axis thereof to perform a variable power operation from a wide angle end to a telephoto end of the variable power optical system, and the first lens group is moved to make a correction of an image plane position in accordance with the variable power operation,
   wherein
   the first lens of the sub-lens group is a biconvex lens, the second lens of the sub-lens group is a biconcave lens, and the third lens of the sub-lens group is a biconvex lens,
   wherein an air distance along the optical axis exists between the first and second lens, and
   wherein the first lens group includes four lenses including a negative meniscus lens, another negative meniscus lens, a biconcave lens having a negative refractive power, and a positive lens in order from the object side.

* * * * *